United States Patent [19]

Waters et al.

[11] 4,364,048
[45] Dec. 14, 1982

[54] INTERLEAVED SWEEP RADAR DISPLAY FOR IMPROVED TARGET DETECTION

[75] Inventors: William M. Waters, Millersville; George J. Linde, Accokeek, both of Md.

[73] Assignee: The United States of America as represented by the Secretary of the Navy, Washington, D.C.

[21] Appl. No.: 177,707

[22] Filed: Aug. 13, 1980

[51] Int. Cl.³ .............................................. G01S 7/22
[52] U.S. Cl. ............................ 343/5 EM; 343/5 DP; 343/5 CF
[58] Field of Search .............. 343/5 CF, 5 EM, 5 DP

[56] References Cited

U.S. PATENT DOCUMENTS

| | | | |
|---|---|---|---|
| 3,500,402 | 3/1970 | Huele et al. | 343/5 DP X |
| 3,569,966 | 3/1971 | Dunn et al. | 343/5 EM |
| 3,789,396 | 1/1974 | Taylor, Jr. | 343/5 DP |
| 3,870,992 | 3/1975 | Hanna, Jr. | 343/5 DP |
| 3,882,502 | 5/1975 | Peabody et al. | 343/5 DP X |
| 4,017,853 | 4/1977 | Brandao et al. | 343/5 DP |

FOREIGN PATENT DOCUMENTS

| | | | |
|---|---|---|---|
| 2840938 | 3/1980 | Fed. Rep. of Germany | 343/5 CF |
| 1272744 | 3/1972 | United Kingdom | 343/5 CF |

Primary Examiner—Malcolm F. Hubler
Attorney, Agent, or Firm—Robert F. Beers; William T. Ellis; Vincent J. Ranucci

[57] ABSTRACT

A system, which interfaces with a radar indicator, for improving signal-to-noise ratio (SNR) and enhancing the detection of moving targets includes an analog-to-digital (A/D) converter, an integrator, a digital memory, a digital-to-analog (D/A) converter, and a synchro-to-digital converter. Radar video is converted to digital signals which are integrated and stored in memory. The angle signal from the antenna pedestal synchro is fed to the synchro-to-digital converter and stored in memory. The contents of the memory is processed, converted to analog form, and fed to the indicator. The radar provides a number M of sweeps within each beamwidth, or angular sector, of the antenna during each antenna scan. Contiguous sets of M sweeps are added to form batches. The signal content for each batch is displayed on the indicator in the angular sector which is identified with the M sweeps. The width of each sector is approximately a beamwidth. Within each sector a number N of batches, which are formed during N successive scans, is displayed on the indicator such that the batch formed during the latest scan appears at the clockwise boundary of a sector and the batch formed during the oldest scan appears at the counter-clockwise boundary. The SNR is improved by digitally adding M successive sweeps and displaying the results from N successive scans in a manner whereby signal-plus-noise from one scan is not corrupted by noise from other scans.

5 Claims, 6 Drawing Figures

INTERLEAVED SWEEP RADAR DISPLAY FOR IMPROVED TARGET DETECTION

BACKGROUND OF THE INVENTION

The invention relates generally to radar target detection and more particularly to enhancing the detection of moving targets without causing collapsing loss.

Conventional surveillance radar displays present detection information in the form of a map. As the radar antenna scans, new data is displayed while the information from previous scans fades from the display. Lack of sufficient persistence in the display makes it difficult to recognize moving targets since the previous map has nearly faded, and is not available for reference during the current scan. However, even if adequate persistence were provided, noise from previous scans would remain on the screen and compete with signals along the tracks from small moving targets, thus degrading the detection performance of the radar systems. This signal-to-noise ratio penalty due to the addition of noise-only with signal-pulse-noise is often called collapsing loss.

SUMMARY OF THE INVENTION

It is the general purpose and object of the present invention to improve the detection of moving targets without causing collapsing loss. Another object is to increase the range of detection. A further object is to reduce the probability that an operator will not notice the target, especially in clutter and high-density environments. Still another object is to present the radial velocity of each target on each antenna scan. These and other objects of the present invention are accomplished by a radar display system that integrates data from a number M of sweeps which defines an angular sector about equal to the beamwidth of the antenna, stores the integrated data in memory, and displays the data on the radar indicator. The process is repeated during successive scans, such that the integrated data from the second, third, etc, scans is displayed on the second, third, etc., respectively, sweep in the corresponding beamwidth sector. The data from the latest scan is added to the memory and displayed while data from the oldest scan is deleted from memory.

As the antenna beam scans across a target, the number M of pulses that are returned depend on beamwidth, scan rate, and pulse repetition frequency (PRF). Instead of displaying individual pulses during beam passage (these appear as an arc on a radar indicator), the pulses having been integrated are displayed as a single spot. The length of the integration interval is about equal to the time-on-target, and the end points of the interval are determined when the antenna beam crosses the boundaries of azimuthal antenna beamwidth sectors.

The novel feature of the present invention is the integration, or addition, of data over a number of sweeps within each beamwidth, the storage of the integrated sweep data in memory, and the addition and deletion of new and old data, respectively, during each scan. This process differs from conventional means which feature pulse-to-pulse integration, that is, the data from each sweep is added to the data on the same sweep from the previous scan.

The advantage of the present invention is that the signal content of each range cell of each sweep is added to the signal content of the corresponding range cell of successive sweeps within a beamwidth of the radar antenna, thereby reducing the required amount of display area. The display area which is saved by integrating M pulses is used to display data from other scans. Thus, data from N scans is combined without collapsing loss, and the operator performs scan-to-scan integration by correlating successive points which are formed along target tracks.

Other objects and advantages of the present invention will become apparent from the following detailed description of the invention when considered in conjunction with the accompanying drawing wherein:

DETAILED DESCRIPTION OF THE INVENTION

Figure 1:
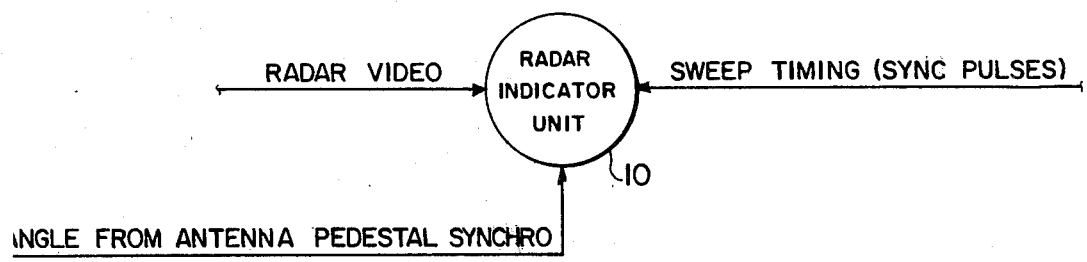
FIG. 1 is a partial block diagram, of a conventional radar display system, which shows signal inputs to a radar indicator unit.

Referring now to the drawing, wherein like reference characters designate like or corresponding parts throughout the views, FIG. 1 shows conventional input signals being fed directly to a standard radar indicator unit 10 such as an AN/UPA-62.

Figure 2:
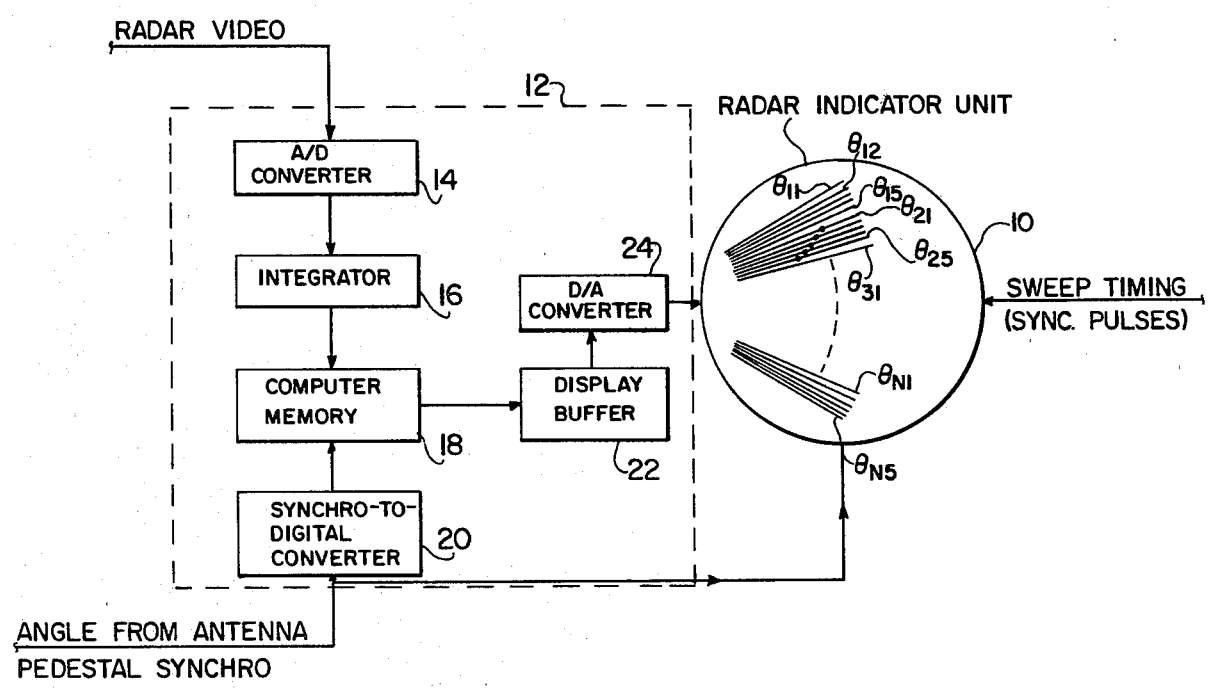
FIG. 2 is a partial block diagram which illustrates the present invention and the signal inputs to a radar indicator unit.

FIG. 2 illustrates the processing of the video and angle signals by the present invention 12 before the signals are fed to the indicator 10. The present invention 12 does not affect the application of the sweep timing signals to the indicator 10 as shown in FIGS. 1 and 2. Normal and MTI radar video from a radar receiver (not shown) is converted from analog to digital form by an analog-to-digital (A/D) converter 14. The output of the A/D converter 14 is fed to an integrator 16 which processes the digital signals in a manner that will be discussed more fully hereinafter. Integrated signals from the integrator 16 are stored in a computer memory 18 such as a NOVA 800. The angle signal from the antenna pedestal synchro is fed to both the indicator 10 and a synchro-to-digital (S/D) converter 20. The output of the S/D converter is stored in the computer memory 18. The output of the memory 18 is fed to a display buffer 22 for matching computer memory speed with the display speed. The digital output of the display buffer 22 is converted to analog by a digital-to-analog (D/A) converter 24 which feeds its output to the indicator 10.

Figure 3:
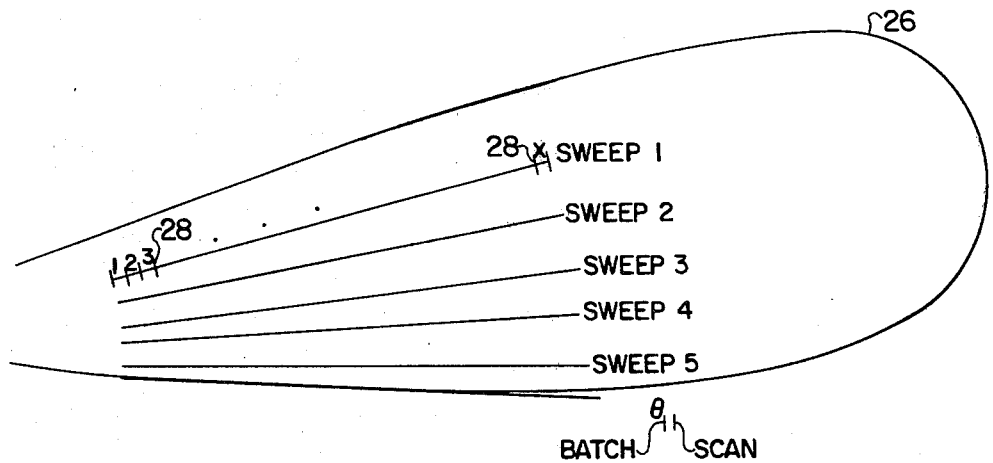
FIG. 3 is a diagram which shows an antenna beam pattern and radial sweep lines.

FIG. 3 illustrates a typical beam pattern 26 for a radar antenna. A number M of radial sweep lines, five being shown in FIG. 3 for purposes of explanation may exist within the beamwidth. Each sweep line includes a number of range cells 28 which contain signal data as radar echo pulses travel along the sweep line. The integrator 16 adds the data from each range cell of each sweep line within the beamwidth to the corresponding range cell of the other sweep lines in the beam, i.e., data from range cell 1 of sweep lines 1 through 5 is added, data from range cell 2 of sweep lines 1 through 5 is added, etc. The result is a sweep line, that is denoted $\theta_{11}$, as shown in FIGS. 2 and 3, which comprises a batch of data from sweep lines 1 through 5, that is, each range cell of sweep line $\theta_{11}$ comprises the data from the corresponding range cells of sweep lines 1 through 5. The subscript 11 of symbol $\theta_{11}$ denotes batch 1 of scan 1. Thus, the integrated signal data included in sweep line $\theta_{11}$ appears, for example, as a dot, on the radar indicator but the data on individual sweep lines 1 through 5 does not appear on the indicator. The integrated data of sweep line $\theta_{11}$ appears on the indicator at the clockwise edge of the beam width sector, as shown in FIG. 3, and is stored in the computer memory until the next clockwise scan when the data is again displayed at a slightly different angle.

The process of forming a sweep line of integrated data is performed within successive beamwidths during the same scan. The resultant sweep lines of integrated signal data from the first scan are shown as $\theta_{21}$, $\theta_{31}$, and $\theta_{N1}$ in FIG. 2, that is, $\theta_{21}$ being batch 2 of scan 1, etc. Successive sweep lines (batches) of integrated data which are formed on the same scan, i.e., $\theta_{11}$ and $\theta_{21}$, or $\theta_{21}$ and $\theta_{31}$, or $\theta_{31}$ and $\theta_{41}$, etc. are separated by an angle which is approximately equal to a beamwidth sector.

The process is repeated during successive scans. After the first scan is completed the first batch of the second scan is displayed at $\theta_{12}$, the second batch of the second scan at $\theta_{22}$, etc. as shown in FIG. 2. Since the results of five scans are displayed, for illustrative purposes, $\theta_{11}$ through $\theta_{15}$ are displayed in a beam width sector, $\theta_{21}$ through $\theta_{25}$ are displayed in the succeeding beamwidth sector, $\theta_{31}$ through $\theta_{35}$ in the next sector, ... and $\theta_{N1}$ through $\theta_{N5}$ in the last sector. Thus, in the example of FIG. 2 pulses are stored for five scans, the data from each scan being time-displaced in one-azimuth increments in a counter-clockwise direction. Since, in FIG. 2, the azimuth increment is one-fifth of a beamwidth, data from the sixth scan is stored in the computer memory while data from the first scan is deleted from the memory. For example, during the sixth scan, $\theta_{16}$ replaces $\theta_{15}$, $\theta_{15}$ replaces $\theta_{14}$, ... and $\theta_{12}$ replaces $\theta_{11}$ in the first beamwidth sector. Similarly, $\theta_{26}$ replaces $\theta_{25}$, $\theta_{25}$ replaces $\theta_{24}$, ... and $\theta_{22}$ replaces $\theta_{21}$, ... and $\theta_{N6}$ replaces $\theta_{N5}$, $\theta_{N5}$ replaces $\theta_{N4}$, ... and $\theta_{N2}$ replaces $\theta_{N1}$. The computer 18 which controls this operation may be programmed to retain pulses for a larger or smaller number of scans. The dots in the second beamwidth sector ($\theta_{21}$-$\theta_{25}$) in FIG. 2 correspond to an inbound target. A fixed target would appear as a circular arc.

The present invention, therefore, processes and stores radar information from a number of antenna scans. The display of information on the indicator is a time-compression display, that is, a display which collapses past data into present data by including returns from earlier scans on the indicator. The multiple-scan pattern which appears on the indicator is easily recognized by a radar indicator operator. Since separate locations on the indicator are reserved for data from each of the previous scans, noise from previous scans is not superimposed on signal, and collapsing loss is thereby avoided.

The radar provides the interleaved display system with video, pedestal azimuth, and a sweep timing. The system operates with a conventional radar indicator whose azimuth is controlled by antenna synchro signals. The computer obtains the antenna (and display) azimuth from the S/D converter and times the processing and display sequences so that output video appears at the proper display locations.

Figure 4:
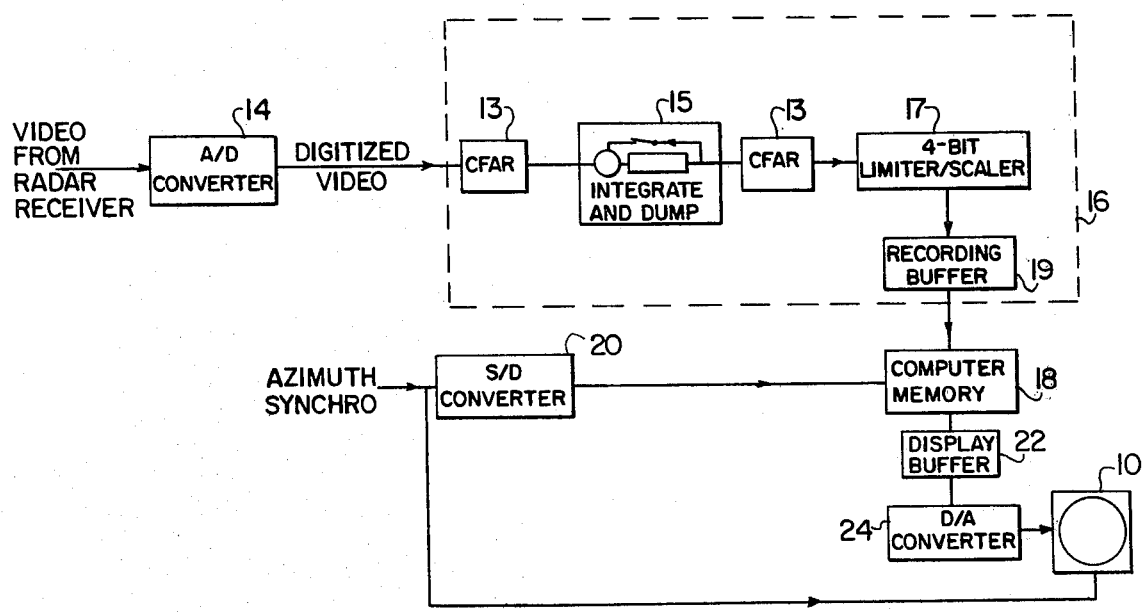
FIG. 4 is a digital implementation of the system shown in FIG. 2.
Figure 5:
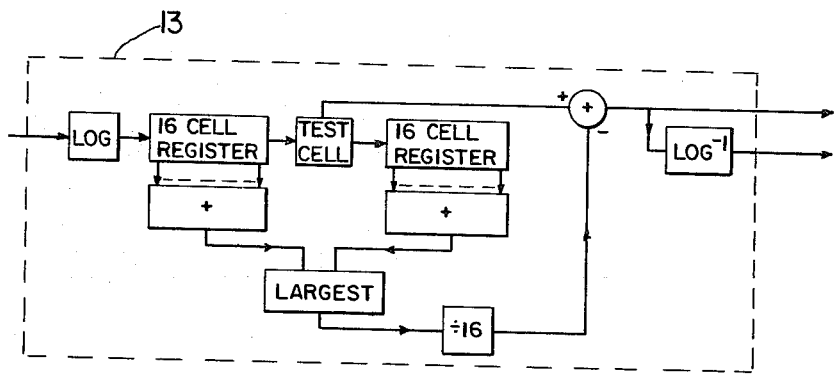
FIG. 5 is a circuit diagram of a log contant false alarm rate (CFAR) normalizer.

FIG. 4 provides a more detailed diagram of the integrator 16. The following is a brief description of the interleaved display system which is shown in FIG. 4. Digital video (both normal and MTI) is applied to a first log constant false alarm rate (CFAR) normalizer 13. The normalizer 13 maintains a constant output noise level in the presence of high levels of interference on some of the radar sweeps and ensures that the integration process which follows is efficient. The normalizer 13 shown in FIG. 5 includes a log circuit followed by two 16-cell shift registers, one on each side of a test cell. The contents of these shift registers provide a noise reference; the mean of the values in each of the registers is computed and the largest mean is subtracted from the test cell value. The output is a number representing the signal-to-noise ratio of the test cell. An antilog is computed and is available along with the log for further processing.

An integrate-and-dump unit 15 sums (batches) a number of radar sweeps corresponding to about 90% of the time on target. The exact size of the batch varies as a function of the rotation rate of the antenna, the PRF, and the input value of antenna beamwidth. The contents of the integrate-and-dump unit are read and cleared under computer control.

A second normalizer (CFAR) 13, identical to the first, follows the integrate-and-dump unit. The function of the second CFAR is to maintain a constant display background in spite of changing batch sizes caused by variable rotation and pulse rates. In addition, since the data will be limited to four bits prior to storage, a constant noise level ensures that noise will not "capture" the limiter.

A limiter/scaler 17 is used to reduce the eight-bit output of the second normalizer 13 to four bits. The scaler is a manual switch-controlled radix point shifter; the limiter is a four-bit magnitude limiter.

A recording buffer 19 stores data when the integrator is dumped and holds it for transfer to the computer memory. The buffer is needed to simplify program timing and it permits dumping of the integrator at rates greater than the computer input speed. Preceding the recording buffer is circuitry (not shown) which packs four-bit data words into sixteen-bit computer words.

The display buffer 22 is needed so that data can be displayed at the original 3-MHz rate and at a proper range. The display buffer also frees the computer for other processing tasks during display.

Computer memory 18 provides the storage for all of the previous scan data. About 28K is available for data storage; the rest is needed for the control program. With 28K of memory and 500 range samples, 224 batches can be stored. If eight scans are interlaced, twenty-eight batches can be processed during each scan. In the experimental system, each batch covers 1.125°, so the processing covers 31.5° of azimuth.

The most important input to the computer is the azimuth of the antenna. This is used to control the interleaved display system processing and the location of the data displayed on the indicator 10.

An input not shown in the diagram is the PRF pretrigger which is used to synchronize the ITCD processing to the radar sweep via the interrupt system of the computer.

The real-time control program has the following manual inputs related to interleaved display system processing:
Radar beamwidth,
Radar PRF
Number of integrated scans,
Azimuth and range of processing area,
Range extent of processing.

The computer measures the antenna pedestal azimuth at each radar pulse. The input data, measured data, and time from an internal clock are then used to compute the following quantities needed by the processing program of the system:
Rotation rate of antenna,
Integration (batch) size,
Azimuth extent of display processing,
Azimuth start of all the batches,
Spacing of previous batches on the display,
Memory storage address for each batch.

Figure 6:
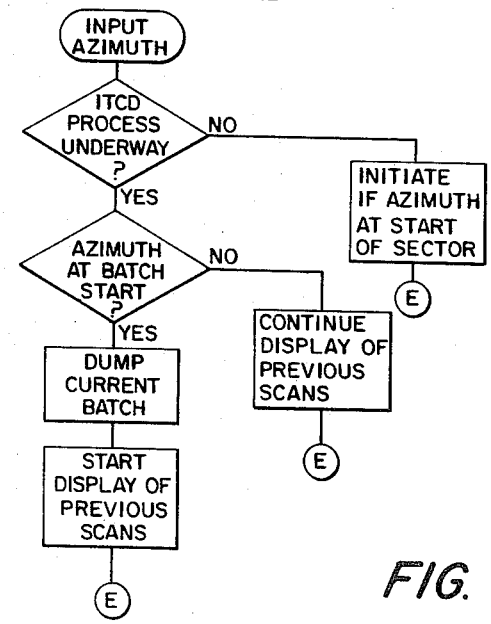
FIG. 6 is a flow chart of a process for computing real-time display position on the radar indicator.

The control program then provides the real-time control of the integrate/dump, the storage of new data in memory, and the display of all previous scans. A simplified flow chart of the process used to compute real-time display position is shown in FIG. 6. This routine is entered via a PRF interrupt at each radar pulse. Antenna azimuth is measured and compared to the computed start values of the batches. If a new batch is to be started, the old one is dumped and the hardware set up to integrate the new one. If the antenna is not at a start point of a new batch, previous scans are displayed. Other computations such as antenna rotation rate are done at a slower rate controlled by real-time clock interrupts.

In estimating a detectable SNR, it is assumed that a radar operator is capable of performing efficient noncoherent integration using the display illustrated in FIGS. 2 and 4. It is also assumed that the target remains in one azimuth sector during the integration interval. However, the SNR changes as the target closes in range, so that a method of calculation, which allows for a changing SNR, must be used.

A simple but accurate method involves standard curves of detection efficiency vs SNR, which deal with an average value. Marinos described a method based upon the assumption that an unweighted video integration is performed over a fixed number of samples where SNR is subject to variation. (P. N. Marinos, "A Method for Computing Vertical-Plane Coverage Diagrams for Frequency Agile Pulse Radar", Proc. IEEE (lte.), pp. 1084–1085 (July 1977). Letting $S_1$, $S_2$, and $S_3$ equal SNR values at the detector input, detector output, and linear integrator output, respectively, $S_3$ depends only on the mean value of $S_2$ (linear video integrator). Thus, for constant values of $P_d$ and $P_{fa}$ (where $P_d$ and $P_{fa}$ are detection and false alarm probabilities, respectively) assume that the corresponding $S_2$ is constant.

The value of $S_1$ corresponding to $S_2$ has been derived by many authors. The expression employed by Marinos, $S_2 = 2S_1^2/(2.3 + S_1)$, is used to obtain an estimate of $S_2$ expressed in terms of the individual input SNR values $S_{1i}$ by $$\frac{1}{M_s} \sum_{1}^{M_s} \frac{2S_{1i}^2}{2.3 + S_{1i}}, \tag{1}$$

where $M_s$ = number of integrated scans.

If $S_o$ equals the SNR when the target reaches range $R_o$, then $$S_{1i} = S_o(R_o/R_i)^4 \tag{2}$$

Substituting (2) into (1)

$$\frac{2S_o^2}{2.3 + S_o} = \frac{1}{M_s} \Sigma \frac{2S_o^2 \left(\frac{R_o}{R_i}\right)^8}{2.3 + S_o \left(\frac{R_o}{R_i}\right)^4} \tag{3}$$

Target velocity $v$ and scan time $T_{sc}$ are introduced by letting $R_i = R_{ms} + (M_s - i)vT_{sc}$, where $R_{ms}$ is target range on the last of $M_s$ scans over which integration is performed. Making this substitution into Eq. (3), and after manipulation $$\frac{M_s}{1+\alpha} = R_o^4 \sum_{1}^{M_s} \frac{[R_{ms} + (M_s - i)vT_{sc}]^{-4}}{1 + \frac{\alpha}{R_o^4}[R_{ms} + (M_s - i)vT_{sc}]^4} \tag{4}$$

where $\alpha = 2.3/S_o$, $S_o$ is determined from standard curves according to desired detection and false alarm probabilities and the total number of noncoherently integrated pulses $MM_s$, (where M = pulses/batch).

Assumptions are made for all parameters except $R_o$. $R_o$ is evaluated by a successive approximations methods applied to Eq. (4). Since the SNR $S_o$ exists at range $R_o$, the improvement factor is calculated by comparing $S_{ms} = (R_{ms}/R_o)^4 S_o$ with the single-scan SNR ($S_{ss}$) for the same values of detection and false alarm probability.

Obviously many more modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a display system of a radar having a scanning antenna and an indicator, said system receiving video signals and antenna pedestal synchro signals, a method for improving radar detection of a moving target comprising:
digitizing said video and synchro signals;
adding data from each range cell of each sweep line within an angular sector of the antenna scan to data from corresponding range cells of other sweep lines in the angular sector for forming a batch of data;
storing the batch of data;
converting said batch of data to analog form; and
displaying said batch of data on the indicator at an azimuth boundary of said angular sector.

2. The method as recited in claim 1, wherein a batch of data is formed and displayed for consecutive angular sectors.

3. The method as recited in claim 1, wherein a number N of batches of data is formed during N successive antenna scans within each angular sectors, the most recent number N of batches being displayed on the indicator.

4. A radar display system, receiving video signals and antenna pedestal synchro signals, for improving the detection of a moving target, comprising:

means for digitizing said video signals;

means for digitizing said antenna pedestal synchro signals;

means for adding data from each range cell of each sweep line within an antenna beamwidth to data from corresponding range cells of other sweep lines within the beamwidth as the beam dwells on the target for forming a batch of data;

means for storing said batch of data and displaying said stored batch at the clockwise boundary of said beam; and means for converting said batch of data to analog form prior to displaying said batch.

5. A radar display system receiving as inputs radar video signals and antenna pedestal synchro signals from a scanning antenna, for improving the detection of moving targets on a display comprising:

means for integrating data from each range cell of each sweep line within an angular sector of the antenna scan to data from corresponding range cells of other sweep lines within said angular sector to thereby form a batch of data;

means for storing said batch of data and displaying said stored batch at the azimuth boundary of the angular sector from which it was integrated simultaneously with display of the previous N-1 batches from that angular sector.

* * * * *